(12) United States Patent
Tay (10) Patent No.: US 11,869,028 B2
(45) Date of Patent: Jan. 9, 2024

(54) SYSTEM AND METHOD FOR PRESENTATION OF OFF-PLATFORM INCENTIVE INFORMATION DURING A MERCHANT PLATFORM SHOPPING SESSION

(71) Applicant: ECOMMERCE ENABLERS PTE. LTD., Singapore (SG)

(72) Inventor: Isaac Wenshu Tay, Singapore (SG)

(73) Assignee: ECOMMERCE ENABLERS PTE. LTD., Singapore (SG)

( * ) Notice: Subject to any disclaimer, the term of this patent is extended or adjusted under 35 U.S.C. 154(b) by 0 days.

(21) Appl. No.: 18/013,654

(22) PCT Filed: May 31, 2021

(86) PCT No.: PCT/SG2021/050303
§ 371 (c)(1),
(2) Date: Dec. 29, 2022

(87) PCT Pub. No.: WO2022/039668
PCT Pub. Date: Feb. 24, 2022

(65) Prior Publication Data
US 2023/0196398 A1 Jun. 22, 2023

(30) Foreign Application Priority Data
Aug. 19, 2020 (SG) .......................... 10202007958X (51) Int. Cl.
*G06Q 30/00* (2023.01)
*G06Q 30/0207* (2023.01)
(Continued)

(52) U.S. Cl.
CPC ......... *G06Q 30/0222* (2013.01); *G06Q 20/12* (2013.01); *G06Q 20/387* (2013.01); *G06Q 30/0283* (2013.01); *G06Q 30/0641* (2013.01)

(58) Field of Classification Search
CPC .. G06Q 30/0222; G06Q 20/12; G06Q 20/387; G06Q 30/0283; G06Q 30/0641
See application file for complete search history.

(56) References Cited

U.S. PATENT DOCUMENTS 10,140,625 B2 11/2018 Hudson et al.
2011/0288906 A1* 11/2011 Thomas ............. G06Q 30/0224
705/7.29
(Continued)

FOREIGN PATENT DOCUMENTS

| CN | 110335071 A | 10/2019 |
|---|---|---|
| KR | 10-2004-0096976 A | 11/2004 |
| KR | 10-2006-0049735 A | 5/2006 |

OTHER PUBLICATIONS

N. Qing-Ping, Y. Chun-Yue and Z. Chen, "The B to C Shopping Website Open Platform and an Associate Strategy," 2012 Second International Conference on Business Computing and Global Informatization, Shanghai, China, 2012, pp. 754-757, doi: 10.1109/BCGIN.2012.202. (Year: 2012).*

(Continued)

*Primary Examiner* — Sun M Li
(74) *Attorney, Agent, or Firm* — JCIP; Joseph G. Chu; Jeremy I. Maynard (57) ABSTRACT

The invention is a system 3-00 and method for presenting off-platform incentive information 14C during shopping sessions conducted on a merchant platform by a consumer. The system 3-00 comprises: (a) a merchant server 31 in data communication with a network 15 during each shopping session; (b) one or more computing devices, each computing device including a display window, a user interface, and a page viewer; (c) one or more payment servers 30A; (d) one or more affiliate servers 30B; and (e) an extension module integrated with the page viewer. The extension module captures merchant platform product pricing and merchant (Continued)

coupon incentives details during the shopping session. The extension also stores or accesses the off-platform incentive information 14C of payment service programs and affiliate programs. The price impact from all the available incentives are presented on at least one modified checkout page 14 for consumer viewing and approval of the transaction.

14 Claims, 5 Drawing Sheets (51) Int. Cl.
    *G06Q 20/12* (2012.01)
    *G06Q 20/38* (2012.01)
    *G06Q 30/0283* (2023.01)
    *G06Q 30/0601* (2023.01)

(56) References Cited

U.S. PATENT DOCUMENTS

| | | | |
|---|---|---|---|
| 2016/0117712 A1* | 4/2016 | Stowers | G06Q 30/0259 705/14.23 |
| 2019/0108547 A1 | 4/2019 | Baker, III | |
| 2019/0180312 A1 | 6/2019 | Postrel | |
| 2020/0051117 A1* | 2/2020 | Mitchell | G06Q 30/0239 |
| 2020/0051149 A1* | 2/2020 | Van Der Spoel | G06Q 30/0222 |
| 2020/0082425 A1* | 3/2020 | Corrieri | G06Q 20/405 |
| 2020/0387923 A1* | 12/2020 | Mitchell | G06Q 20/387 |
| 2021/0049634 A1* | 2/2021 | Ericson | G06Q 30/0239 |

OTHER PUBLICATIONS

T. Kwok and Thao Nguyen, "A novel Web sales tracking solution for multi-channel marketing programs on electronic commerce," Proceedings. IEEE International Conference on e-Commerce Technology, 2004. CEC 2004., San Diego, CA, USA, 2004, pp. 362-365, doi: 10.1109/ICECT.2004.1319759. (Year: 2004).*

Maxing Credit Card Benefits Using Location Based Data,. An IP.com Prior art Database Technical Disclosure Authors et. al.: Melvin Quintos, John Jenkins IP.com No. IPCOM000251298D, IP.com Electronic Publication Date: Oct. 29, 2017 (Year: 2017).*

International Search Report and Written Opinion of International Searching Authority completed on Aug. 5, 2021 for International Application No. PCT/SG2021/050303.

International Preliminary Report on Patentability completed on Jul. 12, 2022 for International Application No. PCT/SG2021/050303.

Notice of Preliminary Rejection dated Jun. 13, 2023 for Korean Application No. 10-2023-7006276.

* cited by examiner

| | |
|---|---|
| CONSUMER REGISTERS SEPARATELY WITH MERCHANT, PAYMENT SERVICE, AND AFFILIATE | 5-01 |
| CONSUMER DOWNLOADS AND INSTALLS AN EXTENSION MODULE ONTO A LAPTOP AND AGREES TO INTEGRATION OF THE EXTENSION MODULE WITH THE LAPTOP'S WEB BROWSER | 5-02 |
| FROM THE LAPTOP'S WEB BROWSER, THE CONSUMER VISITS AN AFFILIATE'S SOCIAL MEDIA POSTING WHICH ADVERTISES A MERCHANT'S PRODUCT ITEM | 5-03 |
| CONSUMER CLICKS THROUGH TO THE MERCHANT'S WEBSITE VIA AN AFFILIATE LINK EMBEDDED WITHIN THE SOCIAL MEDIA POSTING TO VIEW PRODUCT ITEM ON MERCHANT WEBSITE | 5-04 |
| EXTENSION MODULE IDENTIFIES AN AFFILIATE PROGRAM (AND ITS AFFILIATE CASHBACK INCENTIVE) FROM THE AFFILIATE LINK USED BY THE CONSUMER TO REACH THE MERCHANT WEBSITE | 5-05 |
| ON THE MERCHANT WEBSITE, THE CONSUMER SELECTS PRODUCT ITEMS FOR PURCHASE, INPUTS A MERCHANT COUPON CODE, AND PROGRESSES TO CHECKOUT | 5-06 |
| CONSUMER SELECTS A CREDIT CARD FOR THE PURCHASE AND THE EXTENSION MODULE EMPLOYS THIS CREDIT CARD'S INFORMATION TO IDENTIFY THE REBATE THE CONSUMER WILL RECEIVE FROM THE CREDIT CARD COMPANY FOR THE PURCHASE | 5-07 |
| EXTENSION MODULE CALCULATES THE TOTAL SAVINGS FROM THE MERCHANT COUPON DISCOUNT AND THE OFF-PLATFORM INCENTIVE INFORMATION (E.G., THE AFFILIATE CASHBACK AND THE CREDIT CARD REBATE) TO DETERMINE THE EFFECTIVE PRICE FOR THE SELECTED PRODUCT ITEMS OF THE SHOPPING SESSION | 5-08 |
| EXTENSION MODULE MODIFIES THE MERCHANT WEBSITE'S CHECKOUT PAGE TO PRESENT THE TOTAL SAVINGS FROM THE MERCHANT COUPON DISCOUNT, THE AFFILIATE CASHBACK, AND THE CREDIT CARD REBATE (AND HENCE PRESENT THE EFFECTIVE PRICE OF THE PRODUCTS IN THE SHOPPING SESSION) | 5-09 |
| CONSUMER CONFIRMS THE CONSOLIDATED INFORMATION AND APPROVES THE PURCHASE ON THE MERCHANT WEBSITE | 5-10 |
| EXTENSION MODULE TRANSMITS AN AFFILIATE SALES CONFIRMATION TO THE AFFILIATE SERVER | 5-11 |

FIG. 5

SYSTEM AND METHOD FOR PRESENTATION OF OFF-PLATFORM INCENTIVE INFORMATION DURING A MERCHANT PLATFORM SHOPPING SESSION

TECHNICAL CONTRIBUTION

The present disclosure relates to online platform price calculations. More particularly, the present disclosure relates to presentation of off-platform incentive information during a merchant platform shopping session.

BACKGROUND

Figure 1:
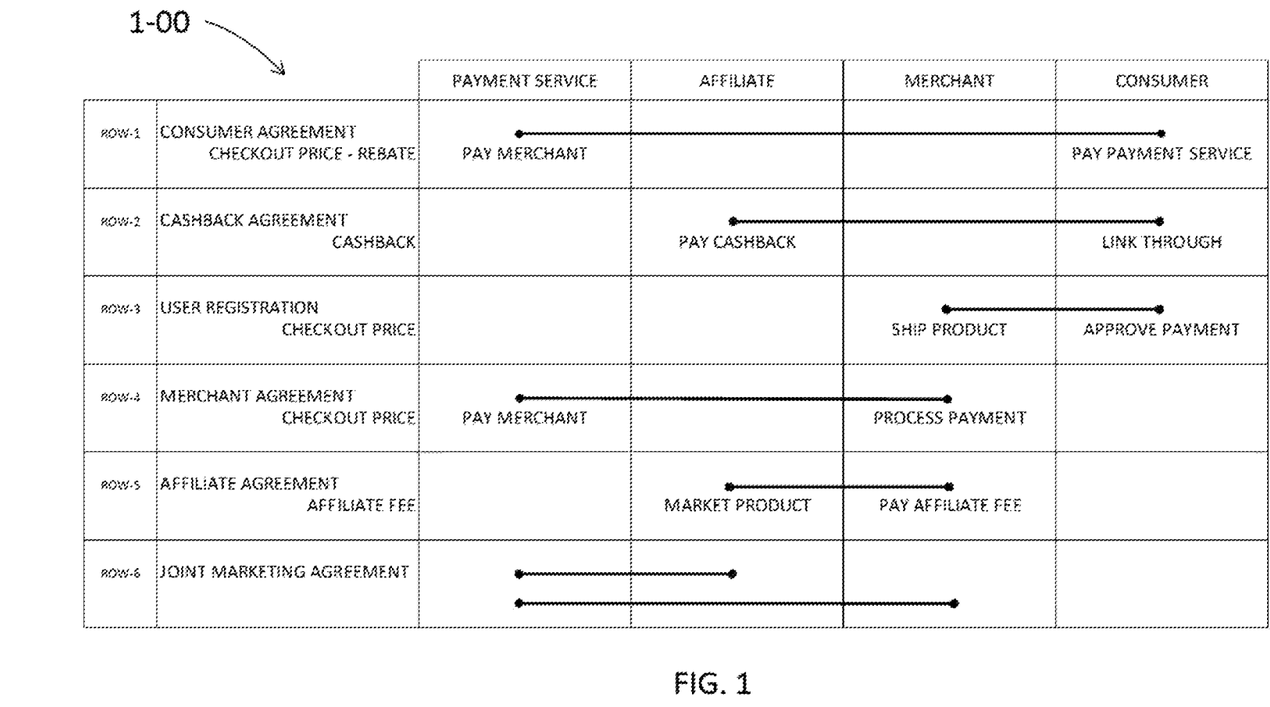
FIG. 1 is a chart summarizing common agreements between parties involving a payment service, an affiliate, a merchant, and a consumer in an embodiment of the invention.

FIG. 1 is a chart 1-00 illustrating common contractual relationships in an ecommerce marketplace. As illustrated, the consumer has a direct contractual relationship (typically documented in a shrink-wrap or click through agreement) with a payment service, an affiliate, and a merchant. Product items can include tangible items, non-tangible items, and/or services.

As illustrated in FIG. 1 chart 1-00 first row ROW-1, the relationship between the consumer and the payment service is typically governed by a consumer agreement where, in general for each authorized purchase transaction, the payment service pays the merchant and the consumer makes a reimbursement payment to the payment service. To incentivize the consumer to choose a specific payment service, a payment service company often offers the consumer various payment service incentives. As depicted in ROW-1, the specific payment service incentive is a rebate. With a rebate, the consumer is invoiced the checkout price minus the rebate awarded for the shopping session by the payment service.

Details of the payment service program can also include non-monetary terms and conditions provided in the consumer agreement. The terms and conditions may for instance provide the consumer with airline redemption "miles" for each dollar invoiced through the payment service, "free" or discounted travel insurance, and/or a discount on future purchases. The consumer will often have more than one payment service to choose from on the checkout pages during a shopping session online, each offering a different set of payment service incentives, terms, and conditions. Popular payment services for online transactions include the branded payment services of PayPal, American Express, Visa, and MasterCard.

As illustrated in the FIG. 1 chart 1-00 second row ROW-2, the relationship between the consumer and the affiliate is governed by a cashback agreement. As depicted in ROW-2, the affiliate offers to pay the consumer a cashback incentive in exchange for the consumer using the affiliate's identifiable link to access the merchant platform. The identifiable link can be embedded within a social media posting, a direct contact message to the consumer (such as a text message service or an email to the consumer), or an affiliate portal advertising the product item. An affiliate portal can be a website run by the affiliate (or a partner of the affiliate) or an app distributed for use by the affiliate. If the consumer does not use the identifiable link (such as by visiting the merchant website directly) the consumer does not earn the cashback incentive.

The cashback incentive can be paid to the consumer directly, such as by wire transfer to the consumer's bank account. Other types of affiliate program incentives can include discounted travel, discount coupons for product items, and/or "free" gifts delivered to the consumer. Confirmation of the affiliate program incentive is typically not visible to the consumer on the checkout pages during the shopping session. Thus a consumer may not be able to immediately confirm that the affiliate incentive was applied to the purchase made by the consumer on the merchant platform.

As illustrated in the FIG. 1 chart 1-00 third row ROW-3, the relationship between the consumer and the merchant is governed by a user registration agreement with terms and conditions. As depicted in ROW-3, the consumer approves payment to the merchant of a checkout price (to be paid to the merchant by the payment service). In exchange, the merchant ships the selected product items to the consumer. The purchase is finalized on a checkout page of the merchant platform. The merchant platform can be accessed via a merchant website on the consumer's laptop or accessed via a merchant app on the consumer's smart phone. The merchant can offer various merchant incentive options to help close the transaction, often implemented with merchant coupon codes. The consumer chooses a selected merchant incentive on a checkout page during the shopping session. The selected merchant incentive reduces a cost of the items to a checkout price approved by the consumer. The cost of items includes the price of each selected product item, applicable sales and value added taxes, and shipping costs. The purchase is finalized on a checkout page on the merchant platform. Any available payment service incentives and any available affiliate program incentives are not presented on the checkout page.

As illustrated in the FIG. 1 chart 1-00 fourth row ROW-4, the relationship between the payment service and the merchant is governed by a merchant agreement. As depicted in ROW-4, the merchant closes the sale with the consumer to process payment through the payment service during the shopping session. The payment service, as summarized above in regard to ROW-1, authorizes payment for the transaction, pays the merchant, and collects the checkout price from the consumer.

As illustrated in the FIG. 1 chart 1-00 fifth row ROW-5, the relationship between the affiliate and the merchant is governed by an affiliate agreement. As depicted in ROW-5, the affiliate promotes and markets the product items of the merchant. The affiliate in a sense acts as a salesman for the merchant, connecting consumers to the merchant platform to finalize their purchases. In exchange for the efforts of the affiliate, the affiliate receives an affiliate fee from the merchant. To provide proper accounting of the affiliate's successful marketing, the affiliate provides the consumer identifiable links to access the merchant platform. These identifiable links include a number or code embedded within the link and are recorded by the merchant platform when used by the consumer to access the merchant platform. Hidden from the consumer, the merchant platform cross-references the identifiable links to individual affiliate programs in the background and reports this information to the relevant affiliate.

As illustrated in the FIG. 1 chart 1-00 sixth row ROW-6, a joint marketing agreement can govern the relationship between: (i) the payment service and the affiliate; and/or (ii) the payment service and the merchant. This joint marketing agreement may dictate an exchange of confidential information, a coordination or fee-sharing for advertisement expenses, and/or payments between the parties.

For some promotions, the joint marketing agreements can impact the pre-conditions and incentive amount provided to the consumer for the incentive. For instance, to promote new membership in their payment service, a credit card company could promote the sale of discounted airline tickets for a specific merchant airline where the preconditions for the discount are that the consumer purchase the airline ticket with that specific merchant airline company using their credit card on the merchant airline's platform. If during checkout the consumer changes the selected payment service at the last minute, this last minute change could eliminate the discount. Similarly, a joint marketing agreement could dictate that an affiliate's cashback incentive is only applicable if a specific payment service is used to pay for the merchant's product item.

The consumer often is not aware of all the potential incentives for a transaction during the shopping session. The conditions for the incentives are publicly available only via a thorough review of various shrink-wrap or click through agreements entered by the consumer augmented by published incentive program information.

In the prior art, efforts have been made to promote visibility to the consumer of various available incentives at checkout. For instance, in U.S. Pat. No. 10,140,625 dated 27 Nov. 2018 and entitled "Systems and Methods for Interfacing with a Website to Modify Content", the patent discloses a method of modifying the checkout pages of a merchant platform during a shopping session to present the various merchant incentives available to the consumer for the selected product items. The various merchant incentives can be, for instance, coupons previously published by the merchant itself on the merchant website, social media postings, or via email marketing. The patent discloses making a small alteration to the merchant platform's checkout page to present these various merchant incentives during the shopping session.

Hence rather than the consumer himself scouring the web for possible coupons, the patent discloses a method of presenting this information within the checkout page on the merchant platform. The patent discloses use of an extension module on the web browser to perform this task. The extension module stores or accesses the merchant incentive information, monitors the shopping session, and presents the merchant incentive coupons on the checkout pages. This prior art, however, is limited to use of on-platform merchant transaction information. Off-platform incentive information is not accessed or presented to the consumer during the shopping session.

What is needed is a system or method for coalescing and presenting off platform incentive information on the checkout pages of the merchant platform during the shopping session.

The larger merchant platforms (such as those branded Amazon, eBay, Lazada, Shopee, Tokopedia, and Alibaba) often host online storefronts with competing product item listings. A single product item, for instance, can be offered by several of these storefronts hosted on the larger merchant platform. However, the identifiable link from the affiliate that the consumer used to reach the merchant platform may only be active for one of the storefronts and not the other storefronts. Furthermore, the checkout price can also be impacted by the choice of the selected payment service.

The consumer thus can easily miss out on a larger rebate or cashback because all the conditions of the affiliate program and/or payment service program are not met. At checkout for instance, the consumer can select a product item by an unsupported storefront, a payment service with a lower rebate or no rebate, and/or a merchant incentive that voids all other incentives. To navigate these complexities on checkout, an improved consumer shopping session experience is needed. The consumer needs easy access to the off-platform incentive information impacting the total savings and effective price for the selected product items.

SUMMARY

Most generally, the invention is a system and method for presenting off-platform incentive information during shopping sessions conducted on a merchant platform by a consumer. The system comprises: (a) a merchant server in data communication with a network during each shopping session; (b) one or more computing devices, each computing device including a display window, a user interface, and a page viewer; (c) one or more payment servers; (d) one or more affiliate servers; and (e) an extension module integrated with the page viewer. The extension module captures merchant platform product pricing and merchant coupon incentives details during the shopping session. The extension also stores or accesses the off-platform incentive information of payment service programs and affiliate programs. The price impact from all the available incentives are presented on at least one modified checkout page for consumer viewing and approval of the transaction.

A first embodiment of the invention is a system for presenting off-platform incentive information during shopping sessions conducted on a merchant platform by a consumer. The system comprises: (a) a merchant server in data communication with a network during each shopping session; (b) one or more computing devices, each computing device including a display window, a user interface, and a page viewer; (c) one or more payment servers in data communication with the network during each shopping session; (d) one or more affiliate servers in data communication with the network; and (e) an extension module integrated with the page viewer during each shopping session.

A second embodiment of the invention is a computer-implemented method for presenting off-platform incentive information during shopping sessions conducted on a merchant platform by a consumer. The method comprises the steps of: (a) accessing a merchant server in data communication with a network during each shopping session; (b) maintaining a computing device, the computing device including a display window, a user interface, and a page viewer; (d) accessing one or more affiliate servers in data communication with the network; and (e) running an extension module integrated with the page viewer during each shopping session.

In the first embodiment and the second embodiment, the merchant server is configured during the shopping session to transmit pages including: (1) product items; (2) one or more merchant incentive options; (3) payment service options; and (4) one or more checkout pages. The merchant server is configured to request from the consumer during the shopping session: (1) a selected payment service chosen from the payment service options; and (2) a selected payment consumer identifier for the selected payment service. The one or more checkout pages together include: (1) one or more selected product items chosen from the product items presented during the shopping session for purchase; (2) a cost of items comprising a sum of fees for all of the one or more selected product items of the shopping session; (3) one or more selected merchant incentives chosen from the one or more merchant incentive options presented during the shopping session for discount; (4) the selected payment service chosen from the payment service options presented during the shopping session for payment; (5) the selected payment consumer identifier of the shopping session; and (6) a checkout price, wherein the checkout price equals the cost of items minus the one or more selected merchant incentives of the shopping session.

In the first and second embodiment of the invention, each computing device is in data communication with the merchant server through the network during each shopping session. Each computing device is configured to receive the pages during the shopping session from the merchant server, the pages including product items, each merchant incentive option, the payment service options, and each checkout page transmitted by the merchant server during the shopping session. The page viewer is configured to present on the display window during the shopping session the product items, each merchant incentive option, the payment service options, and each checkout page received by the computing device from the merchant server during the shopping session.

In the first and second embodiment of the invention, each payment server is configured to: (i) store a plurality of payment consumer records, each payment consumer record identifying a payment consumer identifier and a payment service program with a payment service incentive; and (ii) execute authorized payment requests related to each payment service identifier according to the payment service program and payment service incentive associated with the payment service identifier.

In the first and second embodiment of the invention, each affiliate program includes an affiliate link set and an affiliate program incentive. Each affiliate link set includes one or more identifiable links. Each affiliate server is configured to execute affiliate transactions linkable to each identifiable link according to the affiliate program and affiliate program incentive associated with the identifiable link.

In the first and second embodiment of the invention, the extension module comprising a first capture module, a second capture module, a third capture module, a calculator module, and a web page modifier. The first capture module is configured to capture from each checkout page of the shopping session: (1) the cost of items; (2) the one or more selected merchant incentives; (3) the selected payment service; (4) the selected payment consumer identifier; and (5) the checkout price. The second capture module is configured to store or access the payment service incentive associated with the selected payment service and the selected payment consumer identifier. The third capture module is configured to: (1) store or access the affiliate programs stored on the one or more affiliate servers; (2) the affiliate link sets for the affiliate programs stored on the one or more affiliate servers; (3) detect use of at least one identifiable link contained within the affiliate link sets of the affiliate program stored or accessed by the third capture module; (4) identify the affiliate program for the at least one identifiable link detected during the shopping session; (5) confirm eligibility of the shopping session for the affiliate program identified; and (6) cross reference the affiliate program incentive from the affiliate program confirmed as eligible. The calculator module is configured to calculate a total savings or an effective price for the one or more selected product items in each shopping session. The effective price equals the cost of items minus a total savings applicable to the shopping session. The total savings is the sum of: (a) the one or more selected merchant incentives; (b) the payment service incentive associated with the selected payment service and the selected payment consumer identifier; and (c) the affiliate program incentive from the affiliate program confirmed as eligible. The page modifier is configured to modify one of the checkout pages during the shopping session to present the off-platform incentive information, the off-platform incentive information presented including at least one of: (1) the total savings applicable to the shopping session; and (2) the effective price applicable to the shopping session.

BRIEF DESCRIPTION OF THE DRAWINGS

Embodiments of the present disclosure are described herein with reference to the drawings in which.

DETAILED DESCRIPTION

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein. Unless specified otherwise, the terms "comprising," "comprise," "including" and "include" used herein, and grammatical variants thereof, are intended to represent "open" or "inclusive" language such that they include recited elements but also permit inclusion of additional, un-recited elements.

As used herein, the software and hardware of a "server" may be implemented within: a single stand-alone computer, a stand-alone server, multiple dedicated servers, and/or a virtual server running on a larger network of servers and/or a cloud-based service. As used herein, a database may store data to and access data from a single stand-alone computer, a data server, multiple dedicated data servers, a cloud-based service, and/or a virtual server running on a network of servers.

As used herein, a user interface may be implemented by a monitor with a display window, a keyboard, a mouse, a touch screen, a touch pad, and/or similarly directed means. The user interface may be configured by a laptop, a smart phone, a tablet, a single stand-alone computer, a stand-alone server, multiple dedicated servers, and/or a virtual server running on a larger network of servers and/or a cloud-based service.

As used herein, a database may store data to and access data from a single stand-alone computer, a laptop, a tablet, a data server, multiple dedicated data servers, a cloud-based service, and/or a virtual server running on a network of servers. As discussed in the description, the use of the term "database" indicate a collection of tables, records, and/or linkage information for the data records. As depicted in the description and figures, each database can be maintained separately and/or maintained collectively in a single database or through linkages to other database. The databases depicted in the description and figures can be on the same server or on separate servers. Data records can be stored in one database or linked between separate databases.

As used herein, product items and selected product items can include tangible items (e.g., consumer goods), non-tangible items (e.g., software downloads, movies, or electronic books), or services (e.g., cloud storage, cleaning services, or travel tickets).

The term "page viewer" is used to indicate the use of a web browser on either a laptop, desktop computer, smart phone, or tablet. Page viewer, in use of an app, indicates the software employed by the app (in combination with the smart phone operating system) to present pages on the smart phone display window during the shopping session.

Figure 2:
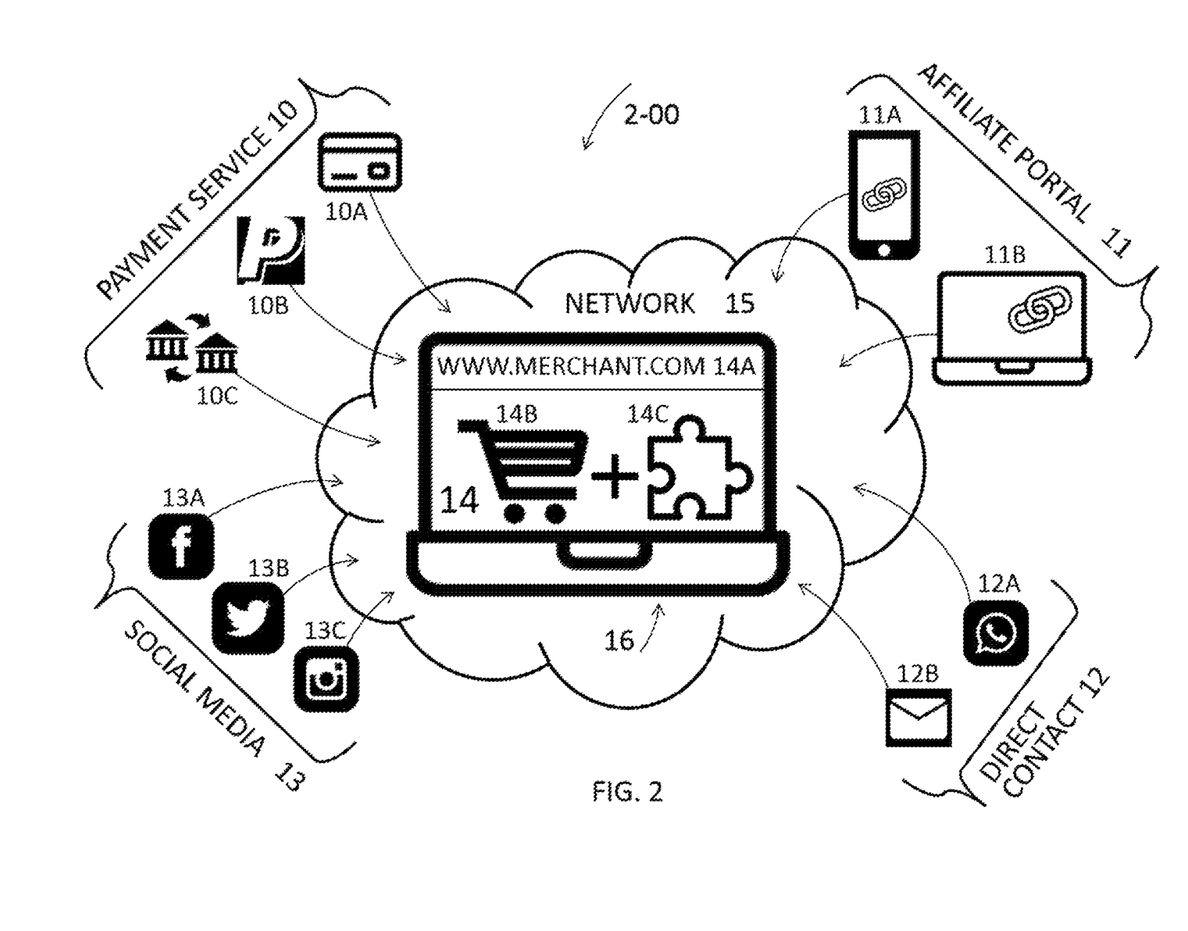
FIG. 2 is a block diagram illustrating the interaction of marketing activities and payment services in relation to a shopping session conducted on a merchant platform in an embodiment of the invention.

FIG. 2 is a block diagram 2-00 illustrating the interaction of marketing activities and payment services in relation to a shopping session conducted on a merchant platform in an embodiment of the invention. A network 15 connects a laptop 16 to payment service options 10, affiliate portals 11, direct contact options 12, and social media options 13. As illustrated, the payment options include credit cards 10A, the PayPal brand payment service 10B, and bank transfer 10C.

In FIG. 2, the affiliate portals 11 are depicted as an app providing identifiable links through a navigable app interface of a smart phone 11A and an affiliate website providing identifiable links on a web browser of a second example laptop 11B. As illustrated, direct contact options 12 can include WhatsApp brand text messages 12A or emails 12B that include identifiable links. As illustrated, social media options 13 include the Facebook 13A, Twitter 13B, and Instagram 13C branded social media postings that include identifiable links. E.g., the identifiable links can be promulgated to the consumer through entertainment, news, or social media posts.

The laptop 16 is illustrated as interacting with a merchant platform available through the merchant website 14A. A checkout page 14 is illustrated on the laptop 16 display window that includes both on-platform merchant transaction information 14B (such as selected product items and selected merchant incentives) from the merchant platform as well as off-platform incentive information 14C. Note that all activity illustrated on FIG. 2 is likely performed on a single laptop or a single smart phone. E.g., browsing for affiliate links on the affiliate portal 11, accessing direct contact options 12, and accessing social media options 13 could all be performed on the laptop 16.

While not illustrated in FIG. 2, the merchant platform checkout page 14 could also be viewed on a desktop computer, a smart phone, or a tablet, rather than a laptop 16. If the merchant platform checkout page 14 is viewed on laptop 16, it would most likely be viewed through a web browser connected to a web server 31A. If the merchant platform checkout page 14 is viewed on smart phone, the checkout page 14 could also be viewed through a web browser connected to the merchant's web server 31A on the smart phone. If the merchant platform checkout page 14 is viewed on smart phone, however, most likely the checkout page 14 would be viewed on in an ecommerce app installed on the smart phone, where the app is connected to the merchant's app server through the network 15.

Figure 3:
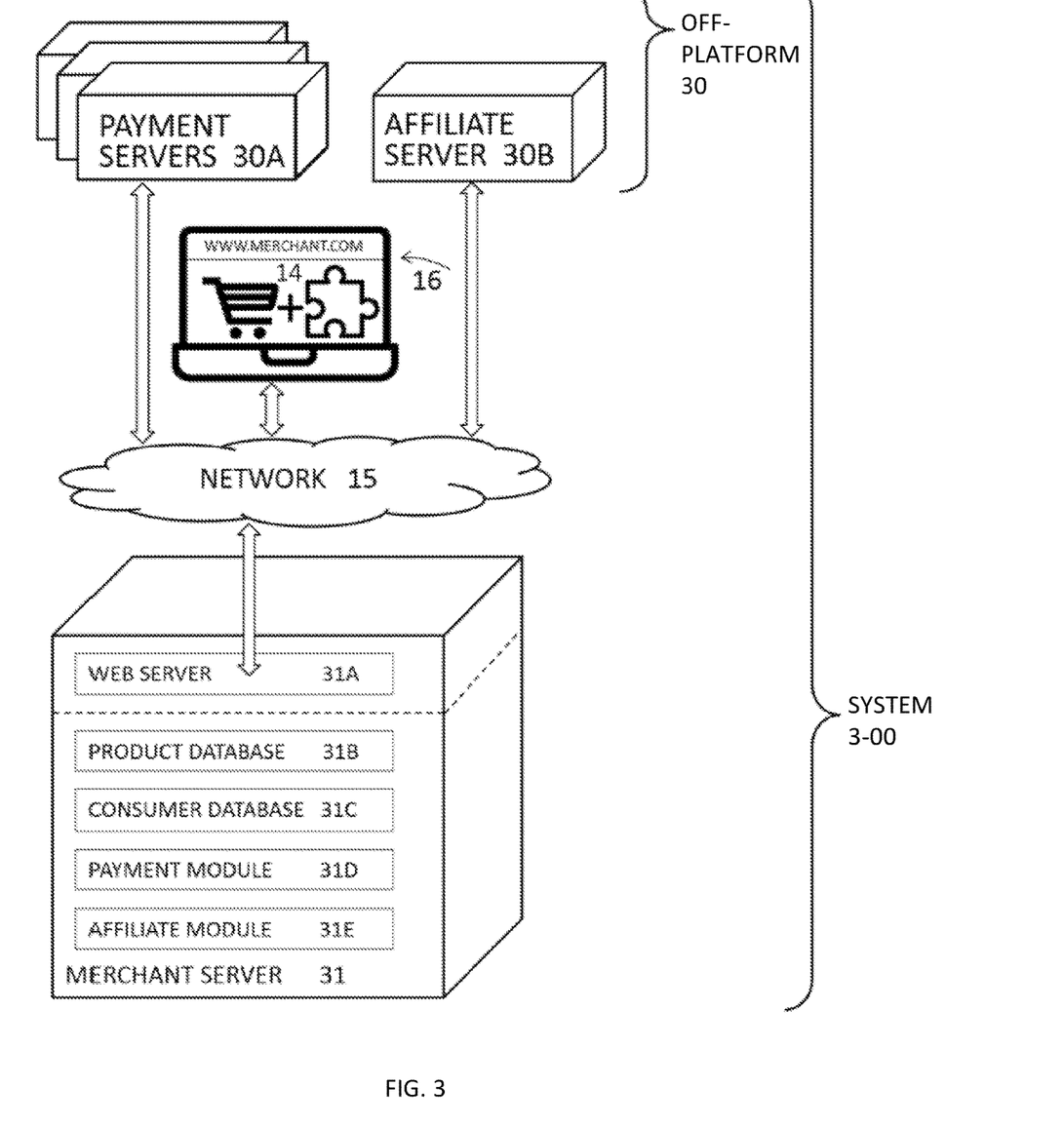
FIG. 3 is a block diagram illustrating of the system for presenting off-channel incentives during shopping sessions conducted on a merchant platform in an embodiment of the invention.

FIG. 3 is a block diagram illustrating the system 3-00 for presenting off-channel incentive information 14C during shopping sessions conducted on a merchant platform in an embodiment of the invention. A merchant server 31 is in data communication with a laptop 16 and an off-platform infrastructure 30 that includes a plurality of payment servers 30A and an affiliate server 30B. The merchant server 31 includes a web server 31A, a product database 31B, a consumer database 31C, a payment module 31D, and an affiliate module 31E. The web server 31A creates checkout pages 14 for viewing on the laptop 16, shielding much of the activity and capabilities of the merchant server 31 from the consumer. E.g., each consumer only has access to their own account information and those product items they have selected. Also the affiliate related information of the affiliate module 31E is shielded from the consumer when engaging with the merchant platform. While not illustrated, the merchant server 31 could also create checkout pages 14 for a smart phone app via an app server located on the merchant server 31. Most of the larger merchants have both website access (through a web browser on a laptop 16 for instance) through a web server 31A and app access (such as through an app running on a smart phone) through an app server.

Figure 4:
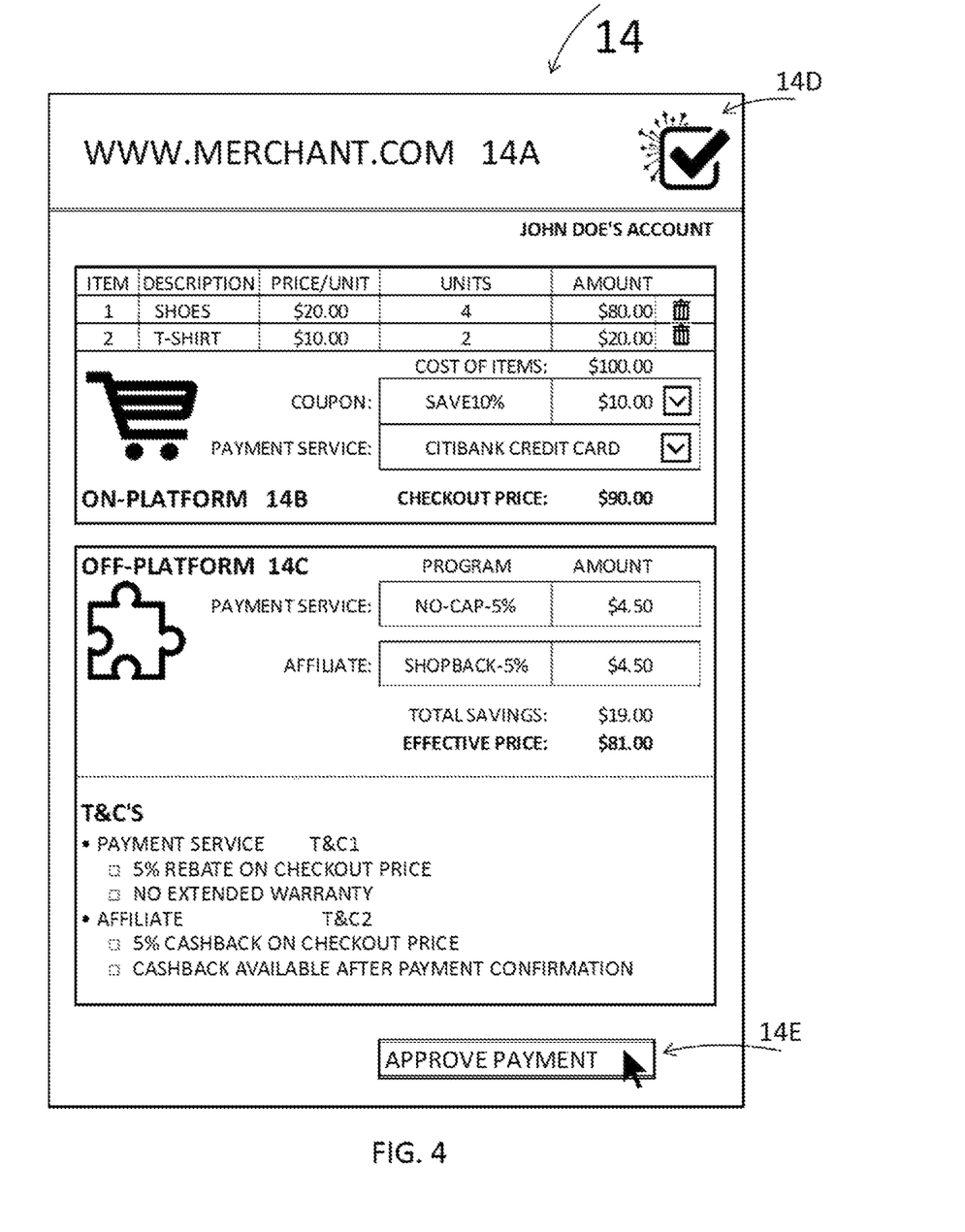
FIG. 4 is an illustration of a checkout page including both merchant platform transaction information as well as off-platform incentive information from a payment service and an affiliate in an embodiment of the invention.

FIG. 4 is an illustration of a checkout page 14 including both on-platform merchant transaction information 14B as well as off-platform incentive information 14C from a payment service and an affiliate in an embodiment of the invention. FIG. 4 illustrates a checkout page 14 including both on-platform merchant transaction information 14B as well as off-platform incentive information 14C for the shopping session. The on-platform merchant information 14B includes consumer name, selected product items descriptions, price/unit cost, number of units, a subtotal for each item, and a cost of items for the selected product items. The on-platform merchant transaction information 14B includes a selected merchant incentive that is illustrated as a SAVE10% coupon that when applied to the $100.00 cost of items results in a $10.00 discount. The on-platform merchant transaction information 14B permits selection from available payment service options 10 and a selected payment service (as illustrated, Citibank Credit Card). A checkout price is the cost of items minus the amount of the selected merchant incentive. Not shown are possible additional fees included in the cost of items, such as sales tax or added value tax and shipping costs.

The off-platform incentive information 14C for the shopping session includes price impact information. A first portion of the off-platform incentive information 14C is a payment service incentive (as illustrated, the NO-CAP-5% rebate) from the selected payment service for a $4.50 rebate available. A second portion of the off-platform incentive information 14C is an affiliate incentive (as illustrated, the Shopback-5% cashback) directed from detection of the identifier link for this affiliate program with a $4.50 cashback available. Note that these amounts are a percentage of the $90.00 checkout price. The total savings of $19.00 includes both the $10.00 selected merchant incentive, the $4.50 affiliate incentive, and the $4.50 payment service incentive. The effective price is the checkout price minus the total savings.

The off-platform incentive information 14C presented on the checkout page 14 in FIG. 4 also includes the key terms and conditions from the payment service T&C1 and the key terms and conditions from the affiliate T&C2. This text field for the terms and conditions is helpful in representing in-kind or contractual program considerations for the payment service program and affiliate program to the consumer. E.g., the payment service incentive and the affiliate program incentive are monetary, and thus quantifiable into a total savings and effective price. But there may be other considerations that influence the consumer's decision such as warranty terms, travel miles, access to travel insurance, et cetera, that are best represented in a text field.

The off-platform incentive information 14C is captured and presented on the checkout page 14 by the extension module. The active operation of the extension module can be signaled to the consumer by a graphic indicator 14D on the tool bar of the web browser. Clicking on this graphic indicator 14D in the web browser tool bar may also initiate the presentation of additional information off-platform incentive information 14C in the display window of the laptop 16.

As illustrated in FIG. 4, the consumer can execute the transaction according to the terms listed on the checkout page 14 by clicking the approve payment button 14E. Subsequent to executing the transaction, the extension module can send an affiliate sales confirmation to the affiliate server 30B. This confirmation is helpful to the affiliate when requesting an affiliate fee from the merchant.

Figure 5:
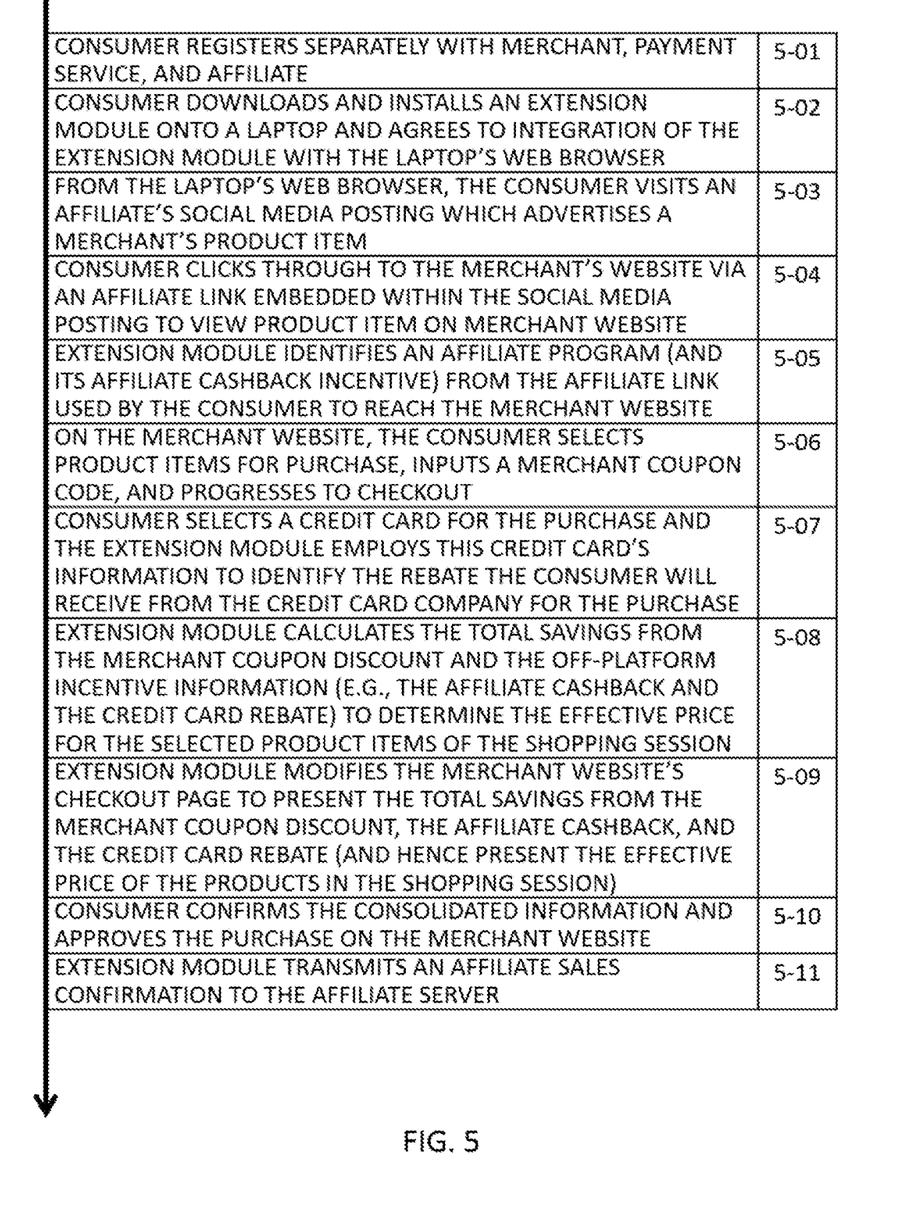
FIG. 5 is a flowchart of a method for combining and presenting merchant platform incentives and off-platform incentive information on a single checkout page in an embodiment of the invention.

FIG. 5 is a flowchart 5-00 of a method for combining and presenting on-platform merchant transaction information 14B and off-platform incentive information 14C on a single checkout page 14 in an embodiment of the invention. Steps 5-01 to 5-10 are listed below.

5-01 consumer registers separately with merchant, payment service, and affiliate 5-02 consumer downloads and installs an extension module onto a laptop 16 and agrees to integration of the extension module with the web browser of the laptop 16

5-03 from the web browser of the laptop 16, the consumer visits an affiliate's social media posting which advertises a merchant's product item 5-04 consumer clicks through to the merchant's website 14A via an affiliate link embedded within the social media posting to view product item on merchant website 14A 5-05 extension module identifies an affiliate program (and its affiliate cashback incentive) from the affiliate link used by the consumer to reach the merchant website 14A 5-06 on the merchant website 14A, the consumer selects product items for purchase, inputs a merchant coupon code, and progresses to checkout 5-07 consumer selects a credit card 10A for the purchase and the extension module employs the credit card 10A information to identify the rebate the consumer will receive from the credit card company for the purchase 5-08 extension module calculates the total savings from the merchant coupon discount and the off-platform incentive information 14C (e.g., the affiliate cashback and the credit card rebate) to determine the effective price for the selected product items of the shopping session 5-09 extension module modifies the checkout page 14 of the merchant website 14A to present the total savings from the merchant coupon discount, the affiliate cashback, and the credit card rebate (and hence present the effective price of the products in the shopping session)

5-10 consumer confirms the consolidated information and approves the purchase on the merchant website 14A Most generally, the invention is a system 3-00 and method for presenting off-platform incentive information 14C during shopping sessions conducted on a merchant platform by a consumer. The system 3-00 comprises: (a) a merchant server 31 in data communication with a network 15 during each shopping session; (b) one or more computing devices, each computing device including a display window, a user interface, and a page viewer; (c) one or more payment servers 30A; (d) one or more affiliate servers 30B; and (e) an extension module integrated with the page viewer. The extension module captures merchant platform product pricing and merchant coupon incentives details during the shopping session. The extension also stores or accesses the off-platform incentive information 14C of payment service programs and affiliate programs. The price impact from all the available incentives are presented on at least one modified checkout page 14 for consumer viewing and approval of the transaction.

A first embodiment of the invention is a system 3-00 for presenting off-platform incentive information 14C during shopping sessions conducted on a merchant platform by a consumer. The system 3-00 comprises: (a) a merchant server 31 in data communication with a network 15 during each shopping session; (b) one or more computing devices, each computing device including a display window, a user interface, and a page viewer; (c) one or more payment servers 30A in data communication with the network 15 during each shopping session; (d) one or more affiliate servers 30B in data communication with the network 15; and (e) an extension module integrated with the page viewer during each shopping session.

A second embodiment of the invention is a computer-implemented method for presenting off-platform incentive information 14C during shopping sessions conducted on a merchant platform by a consumer. The method comprises the steps of: (a) accessing a merchant server 31 in data communication with a network 15 during each shopping session; (b) maintaining a computing device, the computing device including a display window, a user interface, and a page viewer; (d) accessing one or more affiliate servers 30B in data communication with the network 15; and (e) running an extension module integrated with the page viewer during each shopping session.

In the first embodiment and the second embodiment, the merchant server 31 is configured during the shopping session to transmit pages including: (1) product items; (2) one or more merchant incentive options; (3) payment service options 10; and (4) one or more checkout pages 14. The merchant server 31 is configured to request from the consumer during the shopping session: (1) a selected payment service chosen from the payment service options 10; and (2) a selected payment consumer identifier for the selected payment service. The one or more checkout pages 14 together include: (1) one or more selected product items chosen from the product items presented during the shopping session for purchase; (2) a cost of items comprising a sum of fees for all of the one or more selected product items of the shopping session; (3) one or more selected merchant incentives chosen from the one or more merchant incentive options presented during the shopping session for discount; (4) the selected payment service chosen from the payment service options 10 presented during the shopping session for payment; (5) the selected payment consumer identifier of the shopping session; and (6) a checkout price, wherein the checkout price equals the cost of items minus the one or more selected merchant incentives of the shopping session.

In the first and second embodiment of the invention, each computing device is in data communication with the merchant server 31 through the network 15 during each shopping session. Each computing device is configured to receive the pages during the shopping session from the merchant server 31, the pages including product items, each merchant incentive option, the payment service options 10, and each checkout page 14 transmitted by the merchant server 31 during the shopping session. The page viewer is configured to present on the display window during the shopping session the product items, each merchant incentive option, the payment service options 10, and each checkout page 14 received by the computing device from the merchant server 31 during the shopping session.

In the first and second embodiment of the invention, each payment server 30A is configured to: (i) store a plurality of payment consumer records, each payment consumer record identifying a payment consumer identifier and a payment service program with a payment service incentive; and (ii) execute authorized payment requests related to each payment service identifier according to the payment service program and payment service incentive associated with the payment service identifier.

In the first and second embodiment of the invention, each affiliate program includes an affiliate link set and an affiliate program incentive. Each affiliate link set includes one or more identifiable links. Each affiliate server 30B is configured to execute affiliate transactions linkable to each identifiable link according to the affiliate program and affiliate program incentive associated with the identifiable link.

In the first and second embodiment of the invention, the extension module comprising a first capture module, a second capture module, a third capture module, a calculator module, and a web page modifier. The first capture module is configured to capture from each checkout page 14 of the shopping session: (1) the cost of items; (2) the one or more selected merchant incentives; (3) the selected payment service; (4) the selected payment consumer identifier; and (5) the checkout price. The second capture module is configured to store or access the payment service incentive associated with the selected payment service and the selected payment consumer identifier. The third capture module is configured to: (1) store or access the affiliate programs stored on the one or more affiliate servers 30B; (2) the affiliate link sets for the affiliate programs stored on the one or more affiliate servers 30B; (3) detect use of at least one identifiable link contained within the affiliate link sets of the affiliate program stored or accessed by the third capture module; (4) identify the affiliate program for the at least one identifiable link detected during the shopping session; (5) confirm eligibility of the shopping session for the affiliate program identified; and (6) cross reference the affiliate program incentive from the affiliate program confirmed as eligible. The calculator module is configured to calculate a total savings or an effective price for the one or more selected product items in each shopping session. The effective price equals the cost of items minus a total savings applicable to the shopping session. The total savings is the sum of: (a) the one or more selected merchant incentives; (b) the payment service incentive associated with the selected payment service and the selected payment consumer identifier; and (c) the affiliate program incentive from the affiliate program confirmed as eligible. The page modifier is configured to modify one of the checkout pages 14 during the shopping session to present off-platform incentive information 14C, the off-platform incentive information 14C presented including at least one of: (1) the total savings applicable to the shopping session; and (2) the effective price applicable to the shopping session.

In an alternative embodiment of the invention: (a) each affiliate program further includes one or more partner payment services; and (b) wherein the third capture module is further configured to only confirm eligibility of the shopping session for the affiliate program identified upon verification that the selected payment service is at least one of the partner payment services for the affiliate program identified.

In an alternative embodiment of the invention: (a) the page viewer is configured to present in one or more of the checkout pages 14 during each shopping session an approve payment button; and (b) subsequent to selection of the approved payment button by the consumer during the shopping session, the extension module is configured to send an affiliate sale confirmation to at least one of the merchant server 31 and one of the affiliate servers 30B.

In an alternative embodiment of the invention: (a) a name of the payment service incentive associated with the selected payment service and the selected payment consumer identifier; and (b) a cash amount of the payment service incentive associated with the selected payment service and the selected payment consumer identifier.

In an alternative embodiment of the invention: (a) a name of the affiliate program incentive from the affiliate program confirmed as eligible; and (b) a cash amount of the affiliate program incentive from the affiliate program confirmed as eligible.

In an alternative embodiment of the invention: (a) each affiliate program includes a brief affiliate program description; and (b) the off-platform incentive information 14C further includes the brief affiliate program description for the affiliate program identified.

In an alternative embodiment of the invention: (a) wherein each payment service program includes a brief payment service program description; and (b) wherein the off-platform incentive information 14C further includes the brief payment service program description for the payment service program associated with the selected payment service and the selected payment consumer identifier.

In an alternative embodiment of the invention, the page modifier is configured to present the off-platform incentive information 14C presented in at least one of: (a) a portion of a checkout page 14; (b) a pop-up window; (c) a hoverbox; (d) an infotip; and (e) a status bar.

In an alternative embodiment of the invention: (a) each computing device is at least one of a laptop 16, a desktop computer system, a smart phone, and a tablet; (b) the merchant server 31 includes at least one of a web server 31A and an app server; and (c) the page viewer is at least one of a web browser and a navigable app interface.

In an alternative embodiment of the invention, the extension module is at least one of a page viewer extension, a page viewer add-on, a page viewer plug-in, an app add-on, and an app script. While each of these example extension modules are implemented differently, they all accomplish the goal of augmenting the functionality of either the web browser on a laptop 16 or the navigable app interface on a smart phone.

Access by the laptop 16 hosting the shopping session to the merchant server 31 and payment servers 30A will typically be performed in real time. Access by the second capture module and the third capture module to the payment service server and affiliate server 30B is not required in real time. Off-platform incentive information 14C for the payment service incentives and affiliate incentives can be prepared offline and periodically updated by pull or push download to the extension module. The extension module will likely be designed and promoted by a single party, such as just the affiliate, thus some information may be updated more often (or even in real-time) while other information may only be updated on a more intermittent schedule.

The extension module can be configured to detect any interaction between the selected product items, the selected merchant incentive, the selected payment service, and the affiliate program confirmed as eligible to suggest other selection possibilities with higher potential total savings. Such decision making can be performed by an AI/ML machine, allowing decision-making to be improved through experience a multitude of transactions.

Embodiments of the invention have the technical advantage of coalescing and presenting off-platform incentive information 14C and related information during the shopping session on the checkout pages 14 of the merchant platform. This off-platform incentive information 14C assists the decision making of the consumer by confirming the eligibility of all the incentives for the shopping session and the amount of each eligible incentive in the shopping session.

Embodiments of the invention can also alert the consumer in the event there is any undesirable interaction or codependence between the selected merchant incentive, the selected payment service program, and the affiliate program identified by the identifiable link. This information at checkout properly sets consumer expectations for the effective price, which results in the reduction of negative consumer reviews resulting from not meeting mistaken consumer expectations.

Embodiments of the invention can greatly increase consumer loyalty to the affiliate and the affiliate program because the invention prominently displays the financial benefit of the use of the identifiable links to the consumer on the checkout pages. Consumer loyalty is a key metric of the success of any marketing program as it provides on-going return on the expenses incurred during the marketing program.

Embodiments of the invention can also increase leverage of the affiliate during the negotiation of joint marketing agreements with payment service providers. For instance in a joint marketing agreement with a specific payment service, the affiliate can promise to tie the affiliate incentives to the specific payment service (and present this information on the checkout pages), thereby increasing the perceived value of the payment service with consumers.

Consumer loyalty to both the affiliate and the merchant is potentially increased by use of embodiments of the invention as the consumer is given immediate visible confirmation of the value of the relationship between the affiliate and the merchant. With this visibility, the consumer is more likely to gain trust in the affiliate and merchant and exhibit loyalty to the affiliate and merchant during future shopping sessions.

While various aspects and embodiments have been disclosed herein, it will be apparent that various other modifications and adaptations of the invention will be apparent to the person skilled in the art after reading the foregoing disclosure without departing from the spirit and scope of the invention and it is intended that all such modifications and adaptations come within the scope of the appended claims. The various aspects and embodiments disclosed herein are for purposes of illustration and are not intended to be limiting, with the true scope and spirit of the invention being indicated by the appended claims.

The invention claimed is:

1. A system for presenting off-platform incentive information during shopping sessions conducted on a merchant platform by a consumer, the system comprising:
  (a) a merchant server in data communication with a network during each shopping session,
    (i) wherein the merchant server is configured during the shopping session to transmit pages including:
      (1) product items;
      (2) one or more merchant incentive options;
      (3) payment service options; and
      (4) one or more checkout pages;
    (ii) wherein the merchant server is configured to request from the consumer during the shopping session:
      (1) a selected payment service chosen from the payment service options; and
      (2) a selected payment consumer identifier for the selected payment service;
    (iii) wherein the one or more checkout pages together include:
      (1) one or more selected product items chosen from the product items presented during the shopping session for purchase;
      (2) a cost of items comprising a sum of fees for all of the one or more selected product items of the shopping session;
      (3) one or more selected merchant incentives chosen from the one or more merchant incentive options presented during the shopping session for discount;
      (4) the selected payment service chosen from the payment service options presented during the shopping session for payment;
      (5) the selected payment consumer identifier of the shopping session; and
      (6) a checkout price, wherein the checkout price equals the cost of items minus the one or more selected merchant incentives of the shopping session;
  (b) one or more computing devices, each computing device including a display window, a user interface, and a page viewer,
    (i) wherein each computing device is in data communication with the merchant server through the network during each shopping session;
    (ii) wherein each computing device is configured to receive the pages during the shopping session from the merchant server, the pages including product items, each merchant incentive option, the payment service options, and each checkout page transmitted by the merchant server during the shopping session;
    (iii) wherein the page viewer is configured to present on the display window during the shopping session the product items, each merchant incentive option, the payment service options, and each checkout page received by the computing device from the merchant server during the shopping session; and
    (iv) wherein the page viewer is configured to present in one or more of the checkout pages during each shopping session an approve payment button;
  (c) one or more payment servers in data communication with the network during each shopping session, each payment server configured to:
    (i) store a plurality of payment consumer records, each payment consumer record identifying:
      (1) a payment consumer identifier; and
      (2) a payment service program with a payment service incentive; and
    (ii) execute authorized payment requests related to each payment service identifier according to the payment service program and payment service incentive associated with the payment service identifier;
  (d) one or more affiliate servers in data communication with the network, (i) wherein each affiliate program includes an affiliate link set, an affiliate program incentive, and one or more partner payment services;
(ii) wherein each affiliate link set includes one or more identifiable links; and
(iii) wherein each affiliate server is configured to execute affiliate transactions linkable to each identifiable link according to the affiliate program and affiliate program incentive associated with the identifiable link; and (e) an extension module integrated with the page viewer during each shopping session, the extension module comprising:
(i) a first capture module configured to capture from each checkout page of the shopping session:
(1) the cost of items;
(2) the one or more selected merchant incentives;
(3) the selected payment service;
(4) the selected payment consumer identifier; and
(5) the checkout price;
(ii) a second capture module configured to store or access the payment service incentive associated with the selected payment service and the selected payment consumer identifier;
(iii) a third capture module configured to:
(1) store or access the affiliate programs stored on the one or more affiliate servers;
(2) the affiliate link sets for the affiliate programs stored on the one or more affiliate servers;
(3) detect use of at least one identifiable link contained within the affiliate link sets of the affiliate program stored or accessed by the third capture module;
(4) identify the affiliate program for the at least one identifiable link detected during the shopping session;
(5) confirm eligibility of the shopping session for the affiliate program identified upon verification that the selected payment service is at least one of the partner payment services for the affiliate program identified; and
(6) cross reference the affiliate program incentive from the affiliate program confirmed as eligible;
(iv) a calculator module configured to calculate a total savings or an effective price for the one or more selected product items in each shopping session,
(1) wherein the effective price equals the cost of items minus a total savings applicable to the shopping session; and
(2) wherein the total savings is the sum of:
(a) the one or more selected merchant incentives;
(b) the payment service incentive associated with the selected payment service and the selected payment consumer identifier; and
(c) the affiliate program incentive from the affiliate program confirmed as eligible; and
(v) a page modifier configured to modify one of the checkout pages during the shopping session to present off-platform incentive information, the off-platform incentive information presented including at least one of:
(1) the total savings applicable to the shopping session; and
(2) the effective price applicable to the shopping session, wherein subsequent to selection of the approved payment button by the consumer during the shopping session, the extension module is configured to send an affiliate sale confirmation to at least one of the merchant server and one of the affiliate servers,
wherein the page modifier is configured to present the off-platform incentive information presented in at least one of:
(a) a portion of a checkout page;
(b) a pop-up window;
(c) a hoverbox;
(d) an infotip; and
(e) a status bar.

2. The system of claim 1, wherein the off-platform incentive information further includes:
(a) a name of the payment service incentive associated with the selected payment service and the selected payment consumer identifier; and
(b) a cash amount of the payment service incentive associated with the selected payment service and the selected payment consumer identifier.

3. The system of claim 1, wherein the off-platform incentive information further includes:
(a) a name of the affiliate program incentive from the affiliate program confirmed as eligible; and
(b) a cash amount of the affiliate program incentive from the affiliate program confirmed as eligible.

4. The system of claim 1,
(a) wherein each affiliate program includes a brief affiliate program description; and
(b) wherein the off-platform incentive information presented further includes the brief affiliate program description for the affiliate program identified.

5. The system of claim 1,
(a) wherein each payment service program includes a brief payment service program description; and
(b) wherein the off-platform incentive information presented further includes the brief payment service program description for the payment service program associated with the selected payment service and the selected payment consumer identifier.

6. The system of claim 1,
(a) wherein each computing device is at least one of a laptop, a desktop computer system, a smart phone, and a tablet;
(b) wherein the merchant server includes at least one of a web server and an app server; and
(c) wherein the page viewer is at least one of a web browser and a navigable app interface.

7. The system of claim 1, wherein the extension module is at least one of a page viewer extension, a page viewer add-on, a page viewer plug-in, an app add-on, and an app script.

8. A computer-implemented method for presenting off-platform incentive information during shopping sessions conducted on a merchant platform by a consumer, the method comprising the steps of:
(a) accessing a merchant server in data communication with a network during each shopping session,
(i) wherein the merchant server is configured during the shopping session to transmit pages including:
(1) product items;
(2) one or more merchant incentive options;
(3) payment service options; and
(4) one or more checkout pages;
(ii) wherein the merchant server is configured to request from the consumer during the shopping session:

(1) a selected payment service chosen from the payment service options; and
(2) a selected payment consumer identifier for the selected payment service;
(iii) wherein the one or more checkout pages together include:
(1) one or more selected product items chosen from the product items presented during the shopping session for purchase;
(2) a cost of items comprising a sum of fees for all of the one or more selected product items of the shopping session;
(3) one or more selected merchant incentives chosen from the one or more merchant incentive options presented during the shopping session for discount;
(4) the selected payment service chosen from the payment service options presented during the shopping session for payment;
(5) the selected payment consumer identifier of the shopping session; and
(6) a checkout price, wherein the checkout price equals the cost of items minus the one or more selected merchant incentives of the shopping session;
(b) maintaining a computing device, the computing device including a display window, a user interface, and a page viewer,
(i) wherein the computing device is in data communication with the merchant server through the network during each shopping session;
(ii) wherein the computing device is configured to receive the pages during the shopping session from the merchant server, the pages including product items, each merchant incentive option, the payment service options, and each checkout page transmitted by the merchant server during the shopping session;
(iii) wherein the page viewer is configured to present on the display window during the shopping session the product items, each merchant incentive option, the payment service options, and each checkout page received by the computing device from the merchant server during the shopping session; and
(iv) wherein the page viewer is configured to present in one or more of the checkout pages during each shopping session an approve payment button;
(c) accessing one or more payment servers in data communication with the network during each shopping session, each payment server configured to:
(i) store a plurality of payment consumer records, each payment consumer record identifying:
(1) a payment consumer identifier; and
(2) a payment service program with a payment service incentive; and
(ii) execute authorized payment requests related to each payment service identifier according to the payment service program and payment service incentive associated with the payment service identifier;
(d) accessing one or more affiliate servers in data communication with the network,
(i) wherein each affiliate program includes an affiliate link set, an affiliate program incentive, and one or more partner payment services;
(ii) wherein each affiliate link set includes one or more identifiable links; and
(iii) wherein each affiliate server is configured to execute affiliate transactions linkable to each identifiable link according to the affiliate program and affiliate program incentive associated with the identifiable link; and
(e) running an extension module integrated with the page viewer during each shopping session, the extension module comprising:
(i) a first capture module configured to capture from each checkout page of the shopping session:
(1) the cost of items;
(2) the one or more selected merchant incentives;
(3) the selected payment service;
(4) the selected payment consumer identifier; and
(5) the checkout price;
(ii) a second capture module configured to store or access the payment service incentive associated with the selected payment service and the selected payment consumer identifier;
(iii) a third capture module configured to:
(1) store or access the affiliate programs stored on the one or more affiliate servers;
(2) the affiliate link sets for the affiliate programs stored on the one or more affiliate servers;
(3) detect use of at least one identifiable link contained within the affiliate link sets of the affiliate program stored or accessed by the third capture module;
(4) identify the affiliate program for the at least one identifiable link detected during the shopping session;
(5) confirm eligibility of the shopping session for the affiliate program identified upon verification that the selected payment service is at least one of the partner payment services for the affiliate program identified; and
(6) cross reference the affiliate program incentive from the affiliate program confirmed as eligible;
(iv) a calculator module configured to calculate a total savings or an effective price for the one or more selected product items in each shopping session,
(1) wherein the effective price equals the cost of items minus a total savings applicable to the shopping session; and
(2) wherein the total savings is the sum of:
(a) the one or more selected merchant incentives;
(b) the payment service incentive associated with the selected payment service and the selected payment consumer identifier; and
(c) the affiliate program incentive from the affiliate program confirmed as eligible; and
(v) a page modifier configured to modify one of the checkout pages during the shopping session to present off-platform incentive information, the off-platform incentive information presented including at least one of:
(1) the total savings applicable to the shopping session; and
(2) the effective price applicable to the shopping session,
wherein subsequent to selection of the approved payment button by the consumer during the shopping session, the extension module is configured to send an affiliate sale confirmation to at least one of the merchant server and one of the affiliate servers, wherein the page modifier is configured to present the off-platform incentive information presented in at least one of:
(a) a portion of a checkout page;
(b) a pop-up window;
(c) a hoverbox;
(d) an infotip; and
(e) a status bar.

9. The method of claim 8, wherein the off-platform incentive information further includes:
(a) a name of the payment service incentive associated with the selected payment service and the selected payment consumer identifier; and
(b) a cash amount of the payment service incentive associated with the selected payment service and the selected payment consumer identifier.

10. The method of claim 8, wherein the off-platform incentive information further includes:
(a) a name of the affiliate program incentive from the affiliate program confirmed as eligible; and
(b) a cash amount of the affiliate program incentive from the affiliate program confirmed as eligible.

11. The method of claim 8,
(a) wherein each affiliate program includes a brief affiliate program description; and
(b) wherein the off-platform incentive information presented further includes the brief affiliate program description for the affiliate program identified.

12. The method of claim 8,
(a) wherein each payment service program includes a brief payment service program description; and
(b) wherein the off-platform incentive information presented further includes the brief payment service program description for the payment service program associated with the selected payment service and the selected payment consumer identifier.

13. The method of claim 8,
(a) wherein the computing device is at least one of a laptop, a desktop computer system, a smart phone, and a tablet;
(b) wherein the merchant server includes at least one of a web server and an app server; and
(c) wherein the page viewer is at least one of a web browser and a navigable app interface.

14. The method of claim 8, wherein the extension module is at least one of a page viewer extension, a page viewer add-on, a page viewer plug-in, an app add-on, and an app script.

\* \* \* \* \*